(12) United States Patent
Roberts

(10) Patent No.: US 11,592,710 B2
(45) Date of Patent: Feb. 28, 2023

(54) IMAGE ENHANCED LIQUID CRYSTAL DISPLAY DEVICES

(71) Applicant: Brightplus Ventures LLC, Dallas, TX (US)

(72) Inventor: John K. Roberts, Durham, NC (US)

(73) Assignee: Brightplus Ventures LLC, Dallas, TX (US)

( * ) Notice: Subject to any disclaimer, the term of this patent is extended or adjusted under 35 U.S.C. 154(b) by 0 days.

(21) Appl. No.: 17/168,594

(22) Filed: Feb. 5, 2021

(65) Prior Publication Data
US 2022/0252940 A1 Aug. 11, 2022

(51) Int. Cl.
*G02F 1/1335* (2006.01)
*G02F 1/13357* (2006.01)

(52) U.S. Cl.
CPC .......... *G02F 1/133612* (2021.01); *G02F 1/133603* (2013.01)

(58) Field of Classification Search
None
See application file for complete search history.

(56) References Cited

U.S. PATENT DOCUMENTS

| | | | |
|---|---|---|---|
| 2009/0153450 A1* | 6/2009 | Roberts | G09G 3/2003 345/84 |
| 2018/0075814 A1* | 3/2018 | Parikh | G02F 1/133603 |
| 2019/0045591 A1* | 2/2019 | Xie | H05B 45/3725 |
| 2020/0124914 A1* | 4/2020 | den Boer | G09G 3/3614 |

* cited by examiner

*Primary Examiner* — Richard H Kim
(74) *Attorney, Agent, or Firm* — Ascenda Law Group, PC

(57) ABSTRACT

Backlighting panels for LCD displays are described herein which, in some embodiments, enhance contrast ratio, spatial resolution and/or chromaticity differentiation in images output by the LCD displays. In one aspect, an electronic display device comprises a LCD panel comprising pixels, and a backlighting panel comprising an array of solid state lighting devices of differing color. A color management unit is configured to generate color management signals for controlling chromaticity and/or luminance output of the solid state lighting devices, wherein a ratio of the solid state lighting devices to the pixels of the LCD panel is greater than 1.

20 Claims, No Drawings

IMAGE ENHANCED LIQUID CRYSTAL DISPLAY DEVICES

FIELD

The present invention relates to liquid crystal display (LCD) devices and, in particular, to LCD devices employing full-array solid state backlighting panels for enhanced image output.

BACKGROUND

Solid state lighting arrays are used for a number of lighting applications. Solid state lighting panels comprising arrays of solid state lamps have been used as direct illumination sources, for example, in architectural and/or accent lighting. A solid state lamp may include, for example, a packaged light emitting device including one or more light emitting diodes (LEDs). Inorganic LEDs typically include semiconductor layers forming p-n junctions. Organic LEDs (OLEDs), which include organic light emission layers, represent another type of solid state light emitting device. Typically, a solid state light emitting device generates light through the recombination of electronic carriers, i.e. electrons and holes, in a light emitting layer or region.

Solid state lighting panels are commonly used as backlights for small LCD display screens, such as LCD display screens used in portable electronic devices. In addition, there has been increased interest in the use of solid state lighting arrays for backlights of larger displays, such as LCD television displays.

For smaller LCD screens, backlight assemblies may employ white LED lamps that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

LCD displays additionally lack the capability to match contrast ratios provided by other display devices, such as those based on organic light emitting devices (OLEDs). Therefore, LCD displays generally lack the depth and three-dimensionality of OLED displays. Additionally, LCD displays often suffer from blooming. If one zone of the backlighting panel is lit and an adjacent zone is not lit, a bloom or halo-effect can be seen. To combat these problems and enhance image output, local dimming technologies have been developed for LCD displays. However, depending on structural arrangement of the backlighting, local dimming may not mitigate all image distortions. Edge lit backpanels, for example, can still result in images having significant blooming. Additionally, LCD backlights are often limited to white light sources, thereby limiting the color gamut of the displays.

SUMMARY

In view of these disadvantages, backlighting panels for LCD displays are described herein which, in some embodiments, enhance contrast ratio, spatial resolution and/or chromaticity differentiation in images output by the LCD displays. In one aspect, an electronic display device comprises a LCD panel comprising pixels, and a backlighting panel comprising an array of solid state lighting devices of differing color. A color management unit is configured to generate color management signals for controlling chromaticity and/or luminance output of the solid state lighting devices, wherein a ratio of the solid state lighting devices to the pixels of the LCD panel is greater than 1. In some embodiments, for example, the ratio of solid state lighting devices to the pixels ranges from 1.05 to 100.

In another aspect, an electronic display device comprises a LCD panel comprising pixels, and a backlighting panel comprising an array of solid state lighting devices of differing color. A color management unit is configured to generate color management signals for controlling chromaticity and/or luminance output of the solid state lighting devices, wherein the solid state light emitting devices are arranged into greater than 1,000 zones.

As described further herein, the ratio and/or zoning of solid state light emitting devices can dramatically enhance local diming applications and options, thereby providing the LCD panel with improved contrast ratios and mitigation of blooming effects. Moreover, the inclusion of solid state light emitting devices of differing color can improve chromaticity and/or increase the color gamut of the electronic display device.

These and other embodiments are further described in the following detailed description.

DETAILED DESCRIPTION

Embodiments described herein can be understood more readily by reference to the following detailed description and examples. Elements, apparatus, and methods described herein, however, are not limited to the specific embodiments presented in the detailed description and examples. It should be recognized that these embodiments are merely illustrative of the principles of this disclosure. Numerous modifications and adaptations will be readily apparent to those of skill in the art without departing from the spirit and scope of this disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. As used herein, the term "and/or" includes any and all combinations of one or more of the associated listed items.

It will be further understood that the terms "comprises," "comprising," "having," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, all ranges disclosed herein are to be understood to encompass any and all subranges subsumed therein.

For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

In one aspect, an electronic display device described herein comprises a LCD panel comprising pixels, and a backlighting panel comprising an array of solid state lighting devices of differing color. A color management unit is configured to generate color management signals for controlling chromaticity and/or luminance output of the solid state lighting devices, wherein a ratio of the solid state lighting devices to the pixels of the LCD panel is greater than 1. In some embodiments, for example, the ratio of solid state lighting devices to the pixels ranges from 1.05 to 100.

Turning now to specific components, the solid state lighting devices can comprise any solid state lighting devices consistent with the technical objectives described herein. The solid state lighting devices, in some embodiments, are light emitting diodes (LEDs). LEDs for use in the backlighting panel can comprise inorganic LEDs as well as OLEDs. The LEDs can be arranged individually or arranged in packaged sets, where multiple LEDs are provided in a single package or architecture. As described herein, the solid state lighting devices have differing color. Any desired color combination of the solid state lighting devices is contemplated. In some embodiments, the solid state lighting devices comprise red-emitting devices, green emitting devices, and blue emitting devices. Red, green, and blue LEDs, for example, can be employed as the solid state lighting devices. In such embodiments, color mixing of the RGB LEDs can be employed to enhance the color gamut of the LCD display device.

The ratio of solid state lighting devices in the backlighting panel to pixels in the LCD panel is greater than 1. In some embodiments, the ratio of solid state lighting devices to pixels is at least 1.1, at least 1.5 or at least 2. Additional values for the ratio between the solid state lighting devices and pixels of the LCD panel can be selected from Table I.

TABLE I

| Ratio of Solid State Lighting Devices to Pixels |
| --- |
| 1.1-100 |
| 1.5-50 |
| 1.1-10 |
| 1.5-10 |
| 1.7-10 |
| 2-30 |

The ratio of solid state lighting devices to pixels of the LCD display can be selected according to several considerations including, but not limited, to pixel size/pitch, lighting device size, and/or desired arrangement of the lighting devices in the backlighting array. In some embodiments, for example, pixel pitch of the LCD display is less than 1 mm, such as 0.15 mm to 0.7 mm. Alternatively, pixel pitch of the LCD display can be greater than 1 mm, including 1.5-10 mm or 2-5 mm. In some embodiments, size of the solid state lighting devices can be less than or equal to subpixel size of the LCD display. Micro LEDs, for example, can be employed in backlighting panels described herein.

In some embodiments, the solid state lighting devices can be arranged in zones within the backlighting array. Any number of zones of solid state lighting devices in the backlighting array is contemplated. The number of zones can be selected according to several considerations including, but not limited to, the ratio of lighting devices to pixels, desired control and/or chromaticity of the lighting devices relative to image output of the electronic display, signal processing capabilities of the color management unit, microcontroller and/or other electronic components of the electronic display, and design characteristics of the backlighting array relative to the LCD panel. In some embodiments, the backlighting array is a two-dimensional array of solid state lighting devices having a surface coverage area commensurate with the LCD panel. The zones of solid state lighting devices can be uniformly distributed relative to the pixels of the LCD panel. Alternatively, the zones of solid state lighting devices are non-uniformly distributed relative to the pixels of the LCD panel.

Zones of the solid state lighting devices can have any desired shape. Solid state lighting devices, for example, can be arranged/divided into triangular, square, rectangular, hexagonal and/or other polygonal zones. In some embodiments, solid state lighting devices are arranged/divided into circular or elliptical zones. Additionally, zones of the solid state lighting devices may comprise a mixture of different polygonal shapes or a mixture of polygonal, circular, and/or elliptical zones. Moreover, zones of the solid state lighting devices can have the same number or differing numbers of the solid state lighting devices. Zone size, shape, and/or number of solid state lighting devices can be selected and arranged relative to the LCD panel to enhance contrast ratio, spatial resolution, and/or chromaticity of images output by the electronic display device. Therefore, the backlighting panel may exhibit a varying density of zones and/or a varying density of solid state lighting devices across the zones. Such gradients in zone density and/or solid state lighting density can be employed to address image variances across the LCD panel, including brightness/darkness variances, color bleeding, and/or other chromaticity issues.

Any desired number of zones of solid state lighting devices can be employed in the backlighting panel. In some embodiments, greater than 1,000 zones of solid state lighting devices are provided. The number of zones can also be selected from Table II.

TABLE II

| Zones of Solid State Lighting Devices |
| --- |
| 1,000-1,000,000 |
| 5,000-500,000 |
| 2,000-100,000 |
| 1,500-500,000 |
| 1,100-10,000 |

In some embodiments, individual zones of solid state lighting devices can correspond to less than 100 pixels, less than 50 pixels or less than 10 pixels of the LCD panel. Reducing zone size relative to LCD pixels can provide high resolution, thereby enabling the ability to provide chromaticity and/or luminance adjustments to small features or objects in images output by the electronic display device. Zones of reduced size, for example, can enable application of local dimming to small image features, thereby enhancing image quality.

As described herein, the electronic display device comprises a color management unit configured to generate color management signals for controlling chromaticity and/or luminance of the solid state lighting devices. The color management unit, in some embodiments, is in direct electrical communication with driver circuitry and apparatus of the backlighting panel. Color management signals may control individual solid state lighting devices or groups of solid state light devices, such as those in zones described herein. Zones can be independently controlled by differing color management signals. Alternatively, two or more zones may be grouped together to form a region of the backlighting panel controlled by the same color management signal(s). In some embodiments, color management signals are derived from dynamic input signals received be the electronic device. Dynamic input signals can include video input signals received by the electronic device as well as internal signals generated by the electronic device relating to various operating parameters, including solid lighting device temperatures, color output, and luminance of the solid state lighting devices. Color management signals alter driver settings for controlling chromaticity and/or luminance of the solid state lighting devices.

In some embodiments, the electronic display device further comprises a microcontroller in communication with the color management unit. The microcontroller can set one or more control system modes responsive to analysis of color management signals from the color management unit, the control system mode altering chromaticity and/or luminance output of the solid state lighting devices. Analysis of the color management signals can include receipt of dynamic input signals. As described herein, dynamic input signals can include video signals and as well as signals generated internally of the electronic display device. In some embodiments, one or more parameters of the dynamic input signal are compared to current color and/or luminance characteristics of the electronic display. Such comparison, for example, can comprise a difference between the one or more parameters and the current color and/or luminance characteristics of the electronic display. From this analysis or comparison, the microcontroller can set one or more control system modes altering chromaticity and/or luminance output of the solid state lighting devices. In this way, color and/or luminance of individual solid state lighting devices can be altered. In other embodiments, zones of solid state lighting devices can be altered by the control system modes. Zones of solid state lighting devices can be changed and/or dimmed in accordance to the control system modes. The ability to control color and luminance enhances contrast ratio and chromaticity of images output by the electronic display.

The control system modes, for example, may initiate changes via adjustment of pulse width modulation duty cycles of the individual solid state lighting devices or zones of the solid state lighting devices. Other signal processing mechanisms are also available for delivery of the control system modes to driver settings for altering chromaticity and/or luminance of the solid state lighting devices. In some embodiments, processing of the dynamic input signal can include downsampling, compression, and/or other data simplifying techniques to manage signal processing within acceptable timeframes for altering chromaticity and/or luminance of the solid state lighting devices. Downsampling can occur at any desired sampling rate.

Electronic display devices described herein can also comprise one or more LCD controllers for controlling various parameters of the LCD panel, including the LCD shutters. In some embodiments, the LCD controller controls an output image of the electronic display by varying states of the LCD shutters corresponding to different pixels or groups of pixels of the LCD panel.

In another aspect, an electronic display device comprises a LCD panel comprising pixels, and a backlighting panel comprises an array of solid state lighting devices of differing color. A color management unit is configured to generate color management signals for controlling chromaticity and/or luminance output of the solid state lighting devices, wherein the solid state light emitting devices are arranged into greater than 1,000 zones. In some embodiments, the solid state light emitting devices are arranged into a number of zones selected from Table II above. Moreover, an electronic display device comprising such number of zones can have any additional architecture, properties, and/or functions described hereinabove for electronic display devices.

Electronic display devices described herein include portable display devices as well as televisions. In some embodiments, display architectures described herein can be provided for high definition display devices including 1080 P and 4K displays.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An electronic display device comprising:
   a liquid crystal display (LCD) panel comprising pixels;
   a backlighting panel comprising an array of solid state lighting devices of differing color;
   a color management unit configured to generate color management signals for controlling chromaticity and/or luminance output of the solid state lighting devices, wherein a ratio of the solid state lighting devices to the pixels is greater than 1.

2. The electronic display device of claim 1, wherein the ratio of solid state lighting devices to the pixels ranges from 1.05 to 100.

3. The electronic display device of claim 1, wherein the ratio of solid state lighting devices to the pixels ranges from 1.5 to 10.

4. The electronic display device of claim 1, wherein the solid state lighting devices are light emitting diodes.

5. The electronic display of claim 1, further comprising a microcontroller in communication with the color management unit.

6. The electronic display of claim 5, wherein the microcontroller sets a control system mode responsive to analysis of color management signals from the color management unit, the control system mode altering chromaticity and luminance output of the solid state lighting devices.

7. The electronic display device of claim 6, wherein the analysis comprises receipt of dynamic input signal.

8. The electronic device of claim 7, wherein one or more parameters of the dynamic input signal are compared to a current color characteristic of the electronic display.

9. The electronic device of claim 8, wherein the comparison comprises a difference between the one or more parameters and the current color characteristic of the electronic display.

10. The electronic device of claim 8, wherein the parameters of the dynamic input signal comprise chromaticity and luminance of zones of the solid state light emitting devices.

11. The electronic device of claim 10, wherein the solid state light emitting devices are arranged into at least 1,000 zones.

12. The electronic device of claim 10, wherein the solid state light emitting devices are arranged into 10,000 to 1,000,000 zones.

13. The electronic device of claim 10, wherein the zones are independently controlled by the color management unit in conjunction with the microcontroller.

14. The electronic device of claim 11, wherein the zones are uniformly distributed relative to the pixels of the LCD panel.

15. The electronic device of claim 11, wherein the zones are non-uniformly distributed relative to the pixels of the LCD panel.

16. The electronic device of claim 10, wherein each zone corresponds to 50 pixels or less.

17. The electronic device of claim 10, wherein each zone corresponds to 10 pixels or less.

18. The electronic device of claim 1, wherein the pixels comprise sub-pixels of differing color.

19. The electronic display of claim 18, wherein an LCD controller controls an output image of the electronic display by varying states of the LCD shutters corresponding to different pixels of the LCD panel.

20. The electronic display of claim 1, wherein the LCD panel comprises a two-dimensional arrangement of liquid crystal shutters.

\* \* \* \* \*